United States Patent
Astor

(10) Patent No.: US 6,375,229 B1
(45) Date of Patent: Apr. 23, 2002

(54) APPARATUS FOR DRAINING A FLUID FROM A PRESSURE VESSEL AND METHOD OF USE THEREFOR

(75) Inventor: John J. Astor, Bradford, PA (US)

(73) Assignee: Dresser-Rand Company, The Woodlands, TX (US)

( * ) Notice: Subject to any disclaimer, the term of this patent is extended or adjusted under 35 U.S.C. 154(b) by 0 days.

(21) Appl. No.: 09/395,080

(22) Filed: Sep. 13, 1999

(51) Int. Cl.[7] ............................................... F16L 59/16
(52) U.S. Cl. ...................................... 285/55; 285/141.1
(58) Field of Search ..................... 285/55, 368, 141.1, 285/192, 194

(56) References Cited

U.S. PATENT DOCUMENTS

| | | | |
|---|---|---|---|
| 1,366,257 A | * 1/1921 | Gush | 285/55 X |
| 3,240,514 A | * 3/1966 | Bell | 285/141.1 |
| 3,278,202 A | * 10/1966 | Smith | 285/368 X |
| 3,615,984 A | * 10/1971 | Chase | 285/55 |
| 3,704,021 A | 11/1972 | Barbarin et al. | |
| 3,921,673 A | * 11/1975 | Pero | 285/55 X |
| 4,537,425 A | * 8/1985 | Press et al. | 285/55 |
| 4,643,457 A | * 2/1987 | Press | 285/55 |
| 4,691,740 A | * 9/1987 | Svetlik et al. | 285/55 X |
| 5,171,041 A | * 12/1992 | McMillan et al. | 285/55 X |
| 5,402,643 A | 4/1995 | Buchanan et al. | |
| 5,439,257 A | 8/1995 | Williamson | |
| 5,484,172 A | 1/1996 | Unewisse et al. | |
| 5,590,914 A | * 1/1997 | Platner et al. | 285/55 X |
| 5,904,377 A | * 5/1999 | Throup | 285/55 X |
| 6,079,095 A | * 6/2000 | McMillan et al. | 285/55 |

FOREIGN PATENT DOCUMENTS

EP 092791 9/1986

* cited by examiner

Primary Examiner—Lynne H. Browne
Assistant Examiner—David E. Bochna
(74) Attorney, Agent, or Firm—Haynes and Boone, LLP

(57) ABSTRACT

A drain connection is mounted in a bore in a pressure vessel. The bore has a first portion and a second portion. The drain connection includes a housing having an elongated shaft portion received in the first portion of the bore. An interconnect flange is connected at a first end of the shaft portion and a passage extends longitudinally through the shaft portion. An interconnect tube is received in the passage of the housing. The interconnect tube includes a sealing flange connected to seal against the first end of the shaft portion of the housing. A bore sealing portion is connected to extend at least partially through the second portion of the bore. A gasket is disposed between the sealing flange and the housing. A resilient seal is carried by the bore sealing portion of the interconnect tube within the second portion of the bore of the pressure vessel. The resilient seal is compressibly engaged between the bore sealing portion of the interconnect tube and the bore of the pressure vessel whereby the flow of fluid between the bore and the bore sealing portion of the interconnect tube is inhibited.

24 Claims, 2 Drawing Sheets

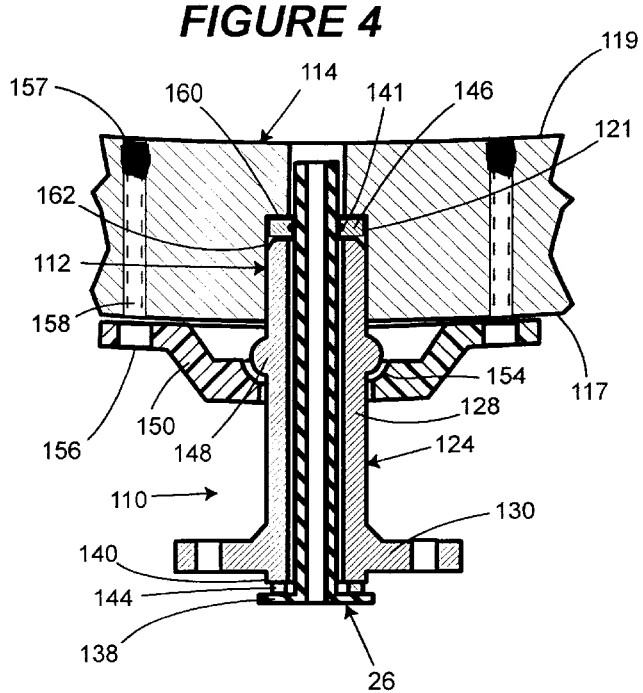
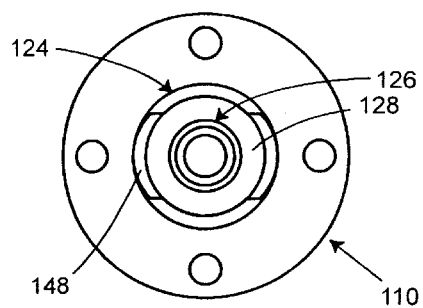
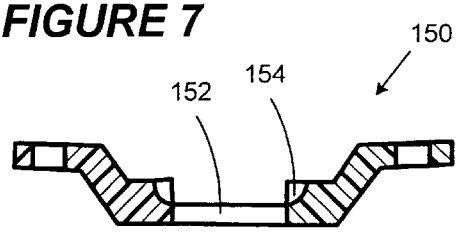
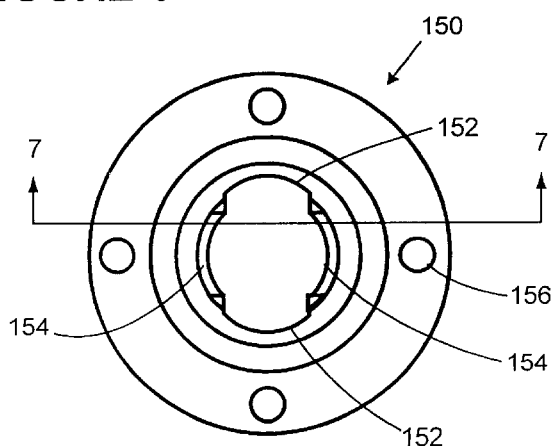

APPARATUS FOR DRAINING A FLUID FROM A PRESSURE VESSEL AND METHOD OF USE THEREFOR

BACKGROUND

The disclosures herein relate generally to fluid interconnections and more particularly to fluid interconnections for a machinery casings used as pressure vessels.

The machinery casing of centrifugal compressors are commonly used as pressure vessels. For example, the DATUM line of compressors manufactured by the Turbo Products Division of Dresser-Rand use the machinery casing as a pressure vessel. In addition to serving as a pressure vessel, the machinery casing may also serve as the structural frame. Various components of the compressor are mounted on or machined into the interior and exterior surfaces of the machinery casing. Items such as stationary flowpath components are attached to an interior surface of the machinery casing. The location of these items can be critical to the performance and operation of related components of the compressor. It is essential that features formed through the machinery casing be precisely aligned with corresponding features formed in stationary flowpath components.

Pressure levels for centrifugal compressors can be as high as 10,000 psi. This requires the machinery casing walls to be very thick. Due to the thickness of the casing walls, large machine tools are needed for machining various features into the machinery casing. In some situations, features cannot be machined into a desired location of the machinery casing from the exterior surface due to obstructions that prevent access by large machine tools. In these instances, the features must be machined from the interior surface of the machinery casing.

Machinery casings, like all pressure vessels, occasionally need to be drained or washed out. During operation, moisture, particulate matter and other undesirable contaminants may accumulate inside the machinery casing. These contaminants may damage or diminish the performance of the machinery and attached equipment. To drain contaminants form a machinery casing, flanged-type drain connections are commonly machined into the casing. These connections may be positioned at several locations on a casing or pressure vessel to permit contaminants to be purged. Similar types of connections may also be used at or near the top of the casing or pressure vessel to permit them to be washed out.

Numerous types of techniques for providing fluid connections with bodies such as machinery casings and pressure vessels are known. O-rings have been used for sealing fluid communicating apparatus. Mating tapered fittings have also been used for establishing connections in various fluid handling applications. Valves and couplings for fluid handling applications have been attached directly to the body of a machine by techniques such as welding. However, none of these connection techniques are suitable for high pressure applications such as centrifugal compressors where alignment of the connection to internal components is critically important. Limited success has been attained in using current techniques and apparatus in applications where a fluid communicating device must be precisely aligned with a component attached to the interior surface of a body. For example, welding a unitary fluid communicating apparatus onto the outside surface of a body may result in warping that can adversely affect alignment of the fluid communicating apparatus and an item attached to the interior surface of the body.

Accordingly, a need has arisen for an apparatus that is configured to overcome the shortcomings of prior art. In particular, a need has arisen for a fluid communicating apparatus for connecting to bodies such as machinery casings and pressure vessels. Fluid communicating apparatus according to the present invention will be well suited for use and installation in areas where conventional flanged connections cannot be used. Additionally, a fluid communicating apparatus is needed that is capable of aligning and sealing with an internal component of a machine. The fluid communicating apparatus will further be configured to decouple the components adapted for providing the structural integrity of the apparatus from those components adapted to provide the fluid communicating functionality.

SUMMARY

One embodiment, accordingly, provides a fluid communicating apparatus that is configured to be received in a bore formed in a body. The apparatushas a portion adapted to provide structural integrity and a portion adapted to provide a seal between the apparatus and the bore of the body. To this end, a fluid communicating apparatus includes a housing having an elongated shaft portion, an interconnect flange connected at a first end of the shaft portion and a passage extending longitudinally through the shaft portion. An interconnect tube is received in the passage of the housing. The interconnect tube includes a sealing flange connected to seal against the first end of the shaft portion of the housing and a bore sealing portion connected to extend beyond a second end of the shaft portion.

A principal advantage of this embodiment is that the bore which receives the fluid communicating apparatus can be formed in locations of the body where obstructions or interferences prevent the machining of flange-type connections. Another advantage is that the housing may be constructed to withstand severe loads and impacts without these loads and impacts being directly transmitted to the interconnect tubing. Yet another advantage is that the bore and housing do not need to be precisely aligned to attain a reliable and effective seal between the interconnect tube and the body.

BRIEF DESCRIPTION OF THE DRAWING FIGURES

FIG. 4 is a cross sectional view showing an illustrative embodiment of a fluid communicating device removably mounted in a single wall body.

FIG. 5 is an end view of the housing shown in FIG. 4.

FIG. 6 is a bottom view of the collar shown in FIG. 4.

FIG. 7 is a cross-sectional side view of the collar viewed along line 7—7 of FIG. 6.

DETAILED DESCRIPTION

Figure 1:
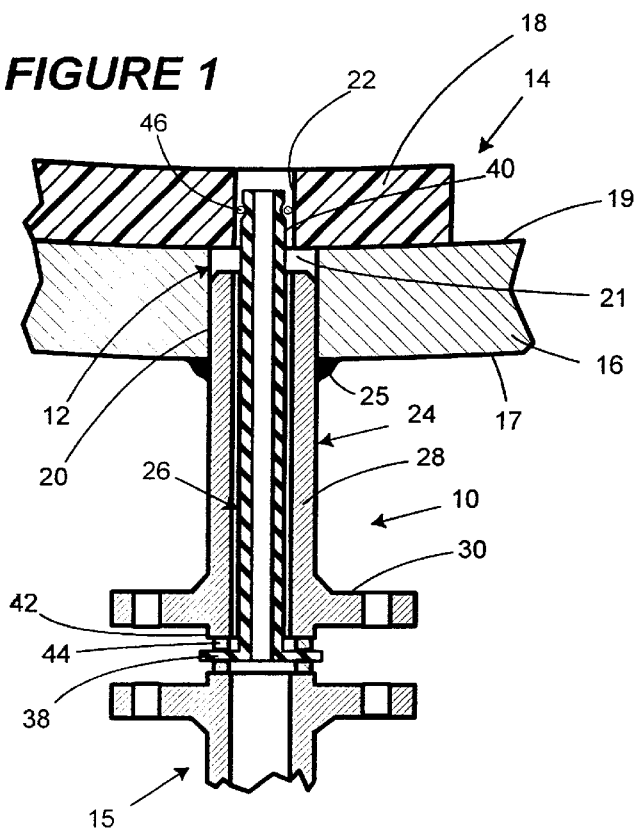
FIG. 1 is a cross sectional view showing an illustrative embodiment of a fluid communicating device permanently mounted in a body having an internally attached component.
Figure 2:
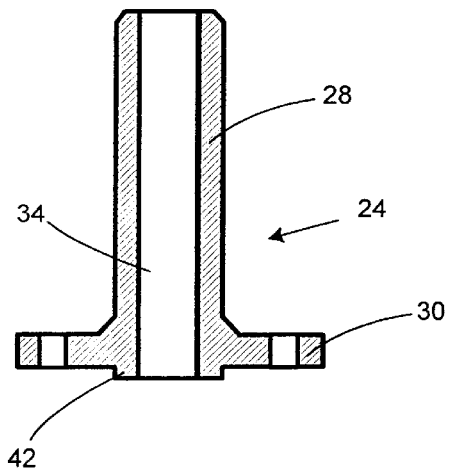
FIG. 2 is a perspective view of the housing shown in FIG. 1.
Figure 3:
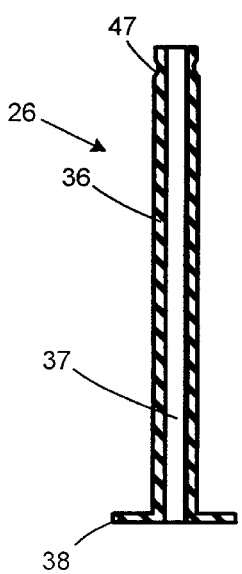
FIG. 3 is a perspective view of the interconnect tube shown in FIG. 1.

FIGS. 1–3 show an illustrative embodiment of a fluid communicating apparatus 10 mounted in the bore 12 of a body 14 such as a machinery casing or pressure vessel. An ancillary apparatus 15 such as a drain hose, solvent tank, or the like may be connected to the fluid communicating apparatus 10 for the purpose of draining contaminants from the body 14 or filling the body 14 with a fluid. The body 14 has an outer wall 16 and an inner wall 18 with an interface 19 between them. The outer wall 16 has a first bore portion 20 formed through it and the inner wall 18 has a second bore portion 22 formed through it. The first and second bore portions 20, 22 are substantially aligned and bore 12 is generally cylindrical in shape. The first bore portion 20 has a larger diameter than the second bore portion 22. The bore 12 may be formed from an exterior surface 17 or interface 19 of the body 14 using commercially available machines and tools. The inner wall may not be contiguous. This is the case where a flowpath component is mounted to the interface 19 of a compressor machinery casing.

The fluid communicating apparatus 10 includes a housing 24 and an interconnecting tube 26. The housing 24 has a cylindrical shaft portion 28 and an interconnect flange 30 attached at the first end of the shaft portion 28. A passage 34 extends longitudinally through the housing 24. One or more welds 25 may be used to secure the housing 24 in place.

The housing 24 and the interconnect tube 26 are made of a suitable material for the intended application. For most high pressure applications, the material will typically be a metal such as steel. In corrosive or high temperature applications, stainless steel is a preferred material. The housing 24 and interconnect tube 26 may be made using techniques such as forging, machining, casting drawing, extrusion or other known fabrication techniques. The technique selected will be based on factors such as the specific end use application, the preferred material, and other design factors.

The housing 24 will typically have an external dimension providing a press-fit or clearance fit with the bore 12. In the case of a clearance fit, a clearance of no more than approximately 0.005 inches will typically be sufficient. This clearance will be adequate to position the fluid communicating apparatus 10 in the body 14 and relative to any internally mounted components.

The interconnect tube 26 includes a tube portion 36 that extends through the passage 34 in the housing 24. The interconnect tube provides a channel 37 for communicating a fluid to or from the body. A sealing flange 38 is attached to the tube portion 36 of the interconnect tube 26 at the end adjacent the interconnect flange 30 of the housing 24. A bore sealing portion 40 is attached to the end of the tube portion 36 that is adjacent to the second end of the shaft portion 28 of the housing 24. The bore sealing portion 40 extends beyond the second end of the shaft portion 28 of the housing 24.

The sealing flange 38 seals against a land region 42 of the housing 24. A gasket 44 made of a suitable commercially-available material for the intended application may be provided between the sealing flange 38 and the land region 42 to ensure a leak-proof seal. The use of a gasket 44 is especially important in instances where the presence of interface 19 would otherwise permit the loss of pressure through a cavity 21 and the passage 34. Another gasket 44 may also be used between the sealing flange 38 and the ancillary apparatus 15.

The bore sealing portion 40 of the interconnect tube 26 is configured to carry a resilient seal 46 such as an O-ring type seal in a recess 47. The O-ring type seal. may be made of a commercially-available material that is suitable for the intended application. When the fluid communicating apparatus 10 is mounted in the bore 12 of the body 14, the resilient seal 46 is compressibly engaged between the bore sealing portion 40 of the interconnect tube 26 and the bore 12 of the body 14. In this fashion, the resilient seal 46 inhibits the flow of fluid between the bore portion 22 and the bore sealing portion 40 of the interconnect tube 26.

The tube portion 36 of the interconnect tube 26 will typically have an external dimension providing a clearance fit with the passage 34 of the housing 24 and with the bore 12. For most applications, a clearance of no more than 0.005 inches will typically be sufficient. The clearance between the bore sealing portion 40 and the second bore portion 22 of the inner wall 18 determines the amount of pressure-induced loading applied on the resilient seal 46. As the clearance between the bore sealing portion 40 and the second bore portion 22 increases, so does the projected area of the resilient seal 46. The load applied to the resilient seal 46 is proportional to the projected area for a given pressure in the body. Therefore, it is important to maintain a clearance that does not adversely affect the integrity and reliability of the seal between the body and the fluid communicating apparatus.

FIGS. 4–7 show an illustrative embodiment of a fluid communicating apparatus 110 removably mounted in a bore 112 of a single walled body 114. A housing 124 includes a pair of spaced-apart shoulders 148 formed on the shaft portion 128 of the housing 124. A collar 150 is used to secure the fluid communicating apparatus to the body 114. The collar 150 has a pair of spaced-apart windows 152 through which the shoulders 148 of the housing 124 pass when the collar 150 is installed on the housing 124. After the collar 150 is installed over the shoulders 148, the collar 150 is rotated to engage a pair of pockets 154 against the shoulders 148. The collar 150 is secured to the body 114 with threaded fasteners (not shown) that are captured in clearance holes 156 in the collar 150 and fastened into threaded holes 158 in the body 114. In applications where obstructions preclude machining from an outer surface 117 of the body, the threaded holes 158 may be formed from adjacent an inside surface 119. To seal the threaded hole, 158, a welded plug 157, a threaded plug or other means may be used for sealing each threaded hole 158 to prevent air flow through them.

A resilient seal 146 is positioned in a cavity 121 with an interconnect tube 126 passing through it. The length of the housing 124, the dimensions of the resilient seal 146 and the position of the shoulders 148 relative to a shelf 160 are configured such that the resilient seal 146 is compressibly engaged against the respective surfaces of the cavity 121 when the collar 150 is secured to the body 114. A bore sealing portion 140 may have a ridge 141 to enhance the compression of the resilient seal 146.

The cavity 121 is established by the surfaces of the bore 112, the second end face 162 of the housing 124, and the interconnect tube 126. The compression of the resilient seal 146 inhibits the flow of fluid between the body 114 and the housing 124 as well as between the housing 124 and the interconnect tube 126. It should be understood that the dimensions of the cavity 121 and the dimensions of the resilient seal 146 must be sized accordingly for an effective seal to be established.

In operation, the embodiments disclosed herein provide a fluid communicating apparatus having a housing that is inserted into the bore of a body. The housing is attached to the body by a technique such as welding or with a mechanical fastening system. A resilient seal is provided between the fluid communicating apparatus and the body. A fluid conduit or container may be attached to the interconnect flange of the fluid communicating apparatus for draining fluid from the body or for directing a fluid into the body.

As a result, one embodiment provides a fluid communicating apparatus having a housing. The housing includes an elongated shaft portion, an interconnect flange connected at a first end of the shaft portion and a passage extending longitudinally through the shaft portion. An interconnect tube is received in the passage of the housing. The interconnect tube includes a sealing flange connected to seal against the first end of the shaft portion of the housing and a bore sealing portion connected to extend beyond a second end of the shaft portion.

In another embodiment, a fluid communicating apparatus mountable in a bore of a body has a housing including an elongated shaft portion, an interconnect flange connected at a first end of the shaft portion and a passage extending longitudinally through the shaft portion. An interconnect tube is received in the passage of the housing. The interconnect tube includes a sealing flange connected to seal against the first end of the shaft portion of the housing and a bore sealing portion connected to extend beyond a second end of the shaft portion. A gasket is disposed between the sealing flange and the housing. A resilient seal is carried by the bore sealing portion of the interconnect tube for being compressibly engaged between the bore sealing portion of the interconnect tube and the bore of the body whereby the flow of fluid between the bore and the bore sealing portion of the interconnect tube is inhibited.

In still a further embodiment, a drain connection is mounted in a bore in a pressure vessel. The bore has a first portion and a second portion. The drain connection includes a housing having an elongated shaft portion received in the first portion of the bore. An interconnect flange is connected at a first end of the shaft portion and a passage extends longitudinally through the shaft portion. An interconnect tube is received in the passage of the housing. The interconnect tube includes a sealing flange connected to seal against the first end of the shaft portion of the housing. A bore sealing portion is connected to extend at least partially through the second portion of the bore. A gasket is disposed between the sealing flange and the housing. A resilient seal is carried by the bore sealing portion of the interconnect tube within the second portion of the bore of the pressure vessel. The resilient seal is compressibly engaged between the bore sealing portion of the interconnect tube and the bore of the pressure vessel whereby the flow of fluid between the bore and the bore sealing portion of the interconnect tube is inhibited.

In yet another embodiment, a method for interconnecting a fluid container with a body to communicate a fluid between the body and the fluid container is provided. The method includes the following steps. Forming a bore in the body; inserting a housing into the bore, the housing including an elongated shaft portion received in the bore, an interconnect flange integral with a first end of the shaft portion and a passage extending longitudinally through the shaft portion; attaching the housing to the body; inserting an interconnect tube into the passage of the housing, the interconnect tube including a sealing flange connected to seal against the housing at the first end of the housing and a bore sealing portion connected to extend from within the passage at a second end of the housing; and forming a resilient seal between the bore and the bore sealing portion to inhibit the flow of fluid between the bore and the bore sealing portion.

As it can be seen, the illustrative embodiments presented herein have several advantages. The bore which receives the fluid communicating apparatus can be formed in locations of the body where obstructions or interferences prevent the machining of flange-type connections. The housing may be constructed to withstand severe loads and impacts without these loads and impacts being directly transmitted to the interconnect tubing. The bore and housing do not need to be precisely aligned to attain a reliable and effective seal between the interconnect tube and the body.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A fluid communicating apparatus, comprising:
   a body having a bore formed therethrough;
   a housing including an elongated shaft portion, an interconnect flange connected at a first end of the shaft portion, a second end of the shaft portion extending into the bore of the body and a passage extending longitudinally through the shaft portion;
   an interconnect tube received in the passage of the housing, the interconnect tube including a sealing flange extending from the passage at the first end of the shaft portion to seal against the first end of the shaft portion of the housing, and a bore sealing portion extending beyond the second end of the shaft portion; and
   a resilient seal, the resilient seal being carried by the bore sealing portion of the interconnect tube, the resilient seal being compressibly engaged between the bore sealing portion of the interconnect tube and the bore of the body, whereby the flow of fluid between the bore and the bore sealing portion of the interconnect tube is inhibited.

2. The apparatus of claim 1 wherein the sealing flange seals against a land region of the housing and wherein a gasket is provided between the sealing flange and the land region.

3. The apparatus of claim 2 further comprising an ancillary apparatus attached to the interconnect flange and wherein a gasket is provided between the sealing flange and the ancillary apparatus.

4. The apparatus of claim 1 where in the resilient seal is an O-ring type seal.

5. The apparatus of claim 1 wherein the resilient seal is carried in a recess formed in the bore sealing portion.

6. The apparatus of claim 1 wherein the housing and the interconnect tube have respective longitudinal axes, the longitudinal axes of the housing and the interconnect tube being substantially parallel.

7. The apparatus of claim 6 wherein the housing is mounted in the bore in the body, the bore and the housing having a common longitudinal axis.

8. The apparatus of claim 7 wherein the body has an inner wall and an outer wall and wherein the bore extends through the inner and outer walls, the bore sealing portion being adjacent a portion of the bore formed in the inner wall.

9. The apparatus of claim 7 further comprising at least one shoulder on the housing and further including a collar having a pocket engaged against each of the at least one shoulders, the collar being fastened to the body whereby the housing is retained in the bore.

10. The apparatus of claim 1 wherein an ancillary apparatus is connected to the interconnect flange.

11. The apparatus of claim 1 wherein the housing further includes a land region and wherein the sealing flange of the interconnect tube seals against the land region.

12. A fluid communicating apparatus mountable in a bore of body, comprising:
- a housing including an elongated shaft portion, an interconnect flange connected at a first end of the shaft portion and a passage extending longitudinally through the shaft portion;
- an interconnect tube received in the passage of the housing, the interconnect tube including a sealing flange connected to seal against the first end of the shaft portion of the housing, and a bore sealing portion connected to extend beyond a second end of the shaft portion;
- a gasket disposed between the sealing flange and the housing;
- a resilient seal carried by the bore sealing portion of the interconnect tube for being compressibly engaged between the bore sealing portion of the interconnect tube and the bore of the body whereby the flow of fluid between the bore and the bore sealing portion of the interconnect tube is inhibited; and
- an ancillary apparatus attached to the interconnect flange and wherein a gasket is provided between the sealing flange and the ancillary apparatus.

13. The apparatus of claim 12 wherein the housing further includes a land region and wherein the sealing flange of the interconnect tube seals against the land region.

14. The apparatus of claim 12 wherein the resilient seal is an O-ring type seal.

15. The apparatus of claim 12 wherein the resilient seal is carried in a recess formed in the bore sealing portion.

16. The apparatus of claim 12 wherein the housing and the interconnect tube have respective longitudinal axes, the longitudinal axes of the housing and the interconnect tube being substantially parallel.

17. The apparatus of claim 16 wherein the housing is mounted in the bore in the body, the bore and the housing having a common longitudinal axis.

18. The apparatus of claim 17 wherein the body has an inner wall and an outer wall and wherein the bore extends through the inner and outer wall, the bore sealing portion being adjacent a portion of the bore formed in the inner wall.

19. The apparatus of claim 17 further comprising at least one shoulder on the housing and further including a collar having a pocket engaged against each of the at least one shoulders, the collar being fastened to the body whereby the housing is retained in the bore.

20. A drain connection for being mounted in a bore in a pressure vessel, the bore having a first portion and a second portion, the drain connection comprising:
- a housing including an elongated shaft portion received in the first portion of the bore, an interconnect flange connected at a first end of the shaft portion, a second end of the shaft portion extending into the bore of the pressure vessel and a passage extending longitudinally through the shaft portion;
- an interconnect tube received in the passage of the housing, the interconnect tube including a sealing flange extending from the passage at the first end of the shaft portion to seal against the first end of the shaft portion of the housing, and a bore sealing portion extending beyond the second end of the shaft portion;
- a gasket disposed between the sealing flange and the housing; and
- a resilient seal carried by the bore sealing portion of the interconnect tube within the second portion of the bore of the pressure vessel, the resilient seal being compressibly engaged between the bore sealing portion of the interconnect tube and the bore of the pressure vessel whereby the flow of fluid between the bore and the bore sealing portion of the interconnect tube is inhibited.

21. A method for mounting a fluid communicating apparatus to a body, comprising:
- forming a bore in the body;
- inserting a housing into the bore, the housing including an elongated shaft portion, an interconnect flange connected at a first end of the shaft portion, a second end of the shaft portion extending into the bore of the body and a passage extending longitudinally through the shaft portion;
- attaching the housing to the body;
- inserting an interconnect tube into the passage of the housing, the interconnect tube received in the passage of the housing, the interconnect tube including a sealing flange extending from the passage at the first end of the shaft to seal against the first end: of the shaft portion of the housing, and a bore sealing portion extending beyond the second end of the shaft portion; and
- forming a resilient seal between the bore and the bore sealing portion to inhibit the flow of fluid between the bore and the bore sealing portion.

22. The method of claim 21 wherein the body has an inner wall and an outer wall and wherein forming the bore includes drilling through the inner and outer walls.

23. The method of claim 21 wherein the step of forming the bore includes the step of drilling through the body from an interior surface of the body.

24. The method of claim 21 wherein attaching the housing to the body includes welding the housing to the body.

* * * * *